(12) United States Patent
Prabhat et al.

(10) Patent No.: US 10,785,021 B1
(45) Date of Patent: Sep. 22, 2020

(54) USER ACCOUNT AUTHENTICATION

(71) Applicant: Amazon Technologies, Inc., Seattle, WA (US)

(72) Inventors: Anshu Piyush Prabhat, Seattle, WA (US); Christopher Darren Maines, Seattle, WA (US); Rajbeer Kaur Bhatia, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 345 days.

(21) Appl. No.: 15/908,049

(22) Filed: Feb. 28, 2018

(51) Int. Cl.
*H04L 29/06* (2006.01)
*H04L 9/08* (2006.01)

(52) U.S. Cl.
CPC .......... *H04L 9/0861* (2013.01); *H04L 9/0863* (2013.01); *H04L 63/0428* (2013.01)

(58) Field of Classification Search
None
See application file for complete search history.

(56) References Cited

U.S. PATENT DOCUMENTS

| 2012/0030371 A1* | 2/2012 | Baptist | H04L 63/123 709/236 |
| 2017/0012949 A1* | 1/2017 | Boren | H04L 63/062 |
| 2018/0241760 A1* | 8/2018 | Stephens | H04L 63/0281 |

* cited by examiner

*Primary Examiner* — Andrew J Steinle
(74) *Attorney, Agent, or Firm* — K&L Gates LLP

(57) ABSTRACT

Methods for authenticating a user account are generally described. In various examples, the methods may comprise performing a first handshake comprising sending authentication data to a first computing device. The authentication data may include a handshake identifier, a user token, and an encryption key. In some examples, the methods may further comprise storing the handshake identifier, the user token, and the encryption key in a database. The methods may further comprise receiving a request for verification of a transaction. The request may comprise the handshake identifier and an encrypted user token. The user token and the encryption key may be retrieved from the database based at least in part on the handshake identifier of the request. The encryption key may be used to decrypt the encrypted user token. A determination may be made that the decrypted user token matches the user token retrieved from the database.

20 Claims, 11 Drawing Sheets

Example UserToken: Base64 encoded bytes: C6WA5g

Example Timestamp: 300 day – 9bits, 23 hour – 5 bits, 59 min – 6 bits
Bits: 10010110011000111011
Base64 encoded bytes: acYN
Full Payload (Base64 encoded bytes): C6WA5mnGDQ Example IV Index: 100
Bits: 1100100
Base64 encoded bytes: Ew
Encrypted Payload (Base64 encoded bytes): oNr4GFkKkg Example HandshakeID (Base64 encoded bytes): GulfgH13ym8=
Full Code (Base64 encoded bytes): oNr4GFkKkhMa4h+AfXfKbw Example UserToken: Base64 encoded bytes: C6WA5g Example Time Counter: Integer 50555709
Sample Hash Token:
    Integer: 388725231
    Base64 encoded bytes: Fyt57w Full Code (Base64 encoded bytes): on6yTJs1BAAXK3nv

USER ACCOUNT AUTHENTICATION

BACKGROUND

Authentication and secure communication techniques are used by many different kinds of computing devices to verify the identity of devices and/or user accounts and to prevent third party devices from impersonating and/or reading communications between the computing devices. Discussed herein are technological improvements to such systems.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
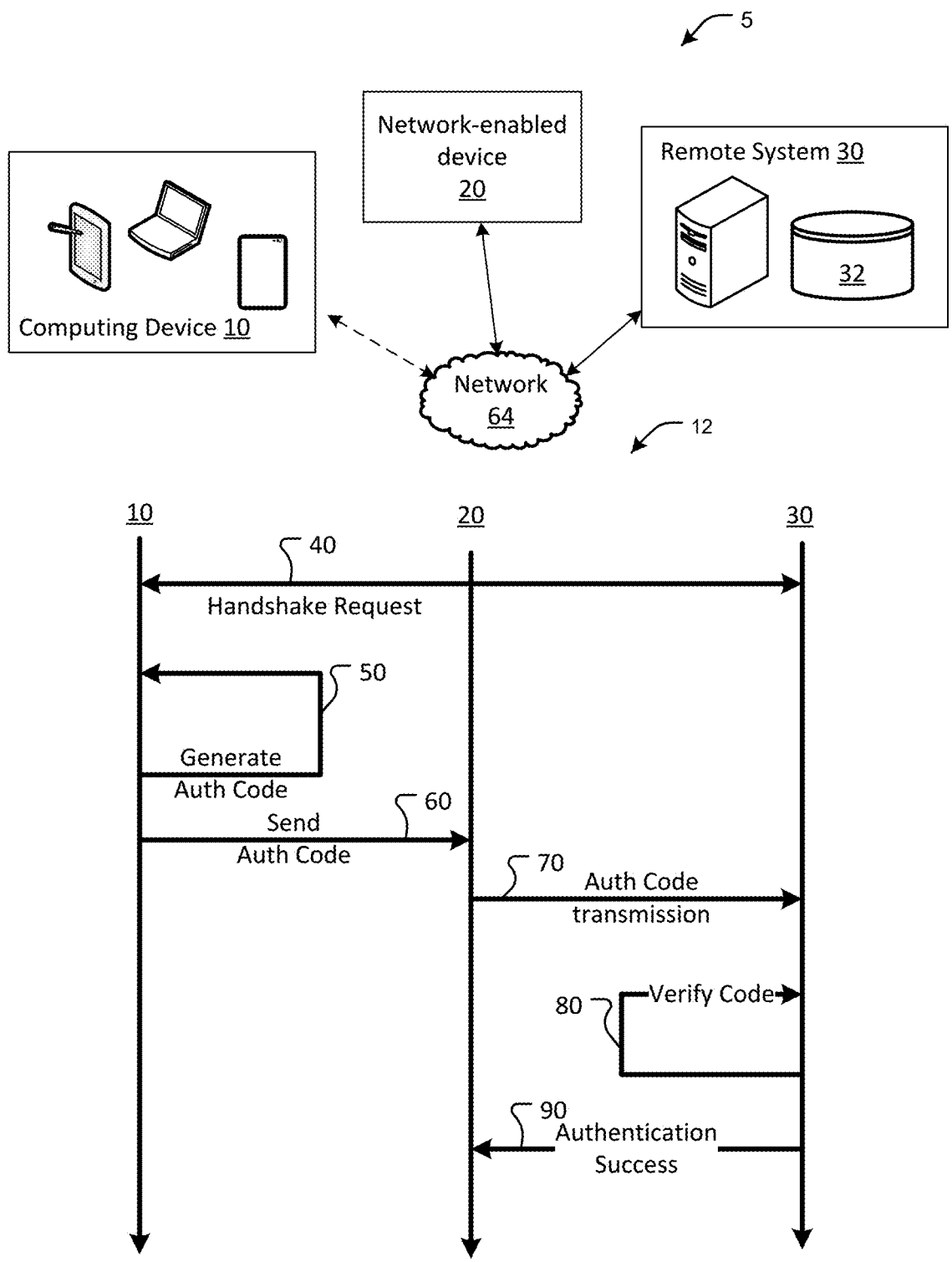
FIG. 1 is a diagram showing one example of an environment for authenticating a computing device, in accordance with various aspects of the present disclosure.

In the following description, reference is made to the accompanying drawings, which illustrate several examples of the present disclosure. It is understood that other examples may be utilized and various operational changes may be made without departing from the spirit and scope of the present disclosure. The following detailed description is not to be taken in a limiting sense, and the scope of the embodiments of the present disclosure is defined only by the claims of the issued patent.

In many secure communication examples, it is desirable to authenticate the devices and/or user accounts associated with devices. Additionally, it may be desirable to keep communications between various devices secret. Authentication occurs when the identity of a device, user, and/or user account is verified. In at least some examples, a user device may be authenticated by a local computing device by displaying on a display of the user device an image comprising an optical machine-readable authentication code representing authentication data that was sent to the user device from a remote system. The authentication data represented by the code may authenticate the user device to the local computing device and may, in turn, permit the user device to perform one or more actions controlled by the local computing device. For example, the code may be a two-dimensional Quick Response Code ("QR code") representing authentication data sent to the user computing device from the remote system upon authentication of the user computing device by the remote system. In the example, the QR code may be displayed on a display of the user computing device, and the local computing device may comprise and/or be in communication with a QR code scanner. The local computing device may scan the QR code displayed on the display of the user computing device. The local computing device may authenticate the user computing device based on the received code. Thereafter, the local computing device and/or one or more other computing devices communicating with the local computing device may authorize the user device and/or a user of the user device to take one or more actions. For example, after authentication of the user device, the local computing device and/or one or more other computing devices communicating with the local computing device may allow the user device to initiate a download, may provide security access to a restricted area, may allow the user device to enter into a transaction such as a purchase or payment, a user account may be verified, etc. In at least some examples, the authentication data sent from the remote system to the user device may be valid for only a certain period of time, in order to mitigate security risks associated with theft of the code.

In the example system described above, the user device may require an active network connection in order to communicate with the remote system to receive the authentication code from a remote system in order to be authenticated. An active network connection may be a data link between a first computing device (e.g., the user device) and a second computing device (e.g., the remote system) allowing data to be sent from the first computing device to the second computing device and from the second computing device to the first computing device using a network protocol such as Transmission Control Protocol and/or Internet Protocol (TCP/IP). An intermittent and/or unreliable internet connection may cause an expired code (e.g., a code that has timed out) to be displayed. In other examples, the lack of an internet connection may prevent the user device from receiving any authentication data, which may cause an authentication error or otherwise result in rejection of the attempted authentication. Such errors can be frustrating for users seeking to perform an action locally that requires authentication. Additionally, some existing systems for reading optical codes may not be able to scan or otherwise receive and interpret two-dimensional QR codes. In some cases, the system may utilize, e.g., a one-dimensional or linear barcode scanner. As a result, conventional forms of authentication require the communication of very large amounts of data, such as the use of digital certificates. Although such authentication methods can be highly reliable and secure, they cannot be feasibly implemented in optical systems having such data limitations. Even two-dimensional QR codes, which can typically encode much more data than one-dimensional barcodes, may not be capable of communicating the amount of data required by such authentication methods.

In various examples described in further detail below, an authentication method is provided that allows user account and/or device authentication without requiring an active network connection (e.g., an internet connection) by a user device. In some examples, the user device may receive authentication data at a time at which a network connection is available. Thereafter, the authentication data may be used by the user device to generate one or more authentication code effective to authenticate the user device and/or a user account associated with the user device to a local computing device. The user device may send the authentication code to the local computing device. In some examples, the authentication code may be sent to the local computing device by displaying a visual representation of the authentication code on a display of the user computing device that may be scanned or otherwise read by the local computing device. No network connection may be required in order to generate the authentication code, provided that the user computing device has previously received the authentication data. Additionally, in at least some examples, no network connection may be required in order to send the authentication code to the local computing device. Further, various encryption and security techniques may be used to prevent fraudulent use of and/or theft of authentication codes and/or authentication data, as described in further detail below.

FIG. 1 is a diagram showing one example of an system 5 for authenticating a computing device, in accordance with various aspects of the present disclosure. FIG. 1 shows a computing device 10, a network-enabled device 20, a remote system 30, and a timing diagram 12 showing messages exchanged between computing device 10, network-enabled device 20 and remote system 30. The computing device 10 may be any suitable type of computing device or application executing on a computing device. For example, the computing device 10 may be a mobile phone, a tablet computer, a laptop computing device, or another mobile computing device. Also, in some examples, the computing device 10 may comprise a software application executing on a computing device, such as a mobile phone. In at least some further examples, the term application may refer to software comprising computer-readable instructions effective to be executed by one or more computing devices. The network-enabled device 20 may be any suitable type of computing device or application executing at a computing device. In at least some examples, network-enabled device 20 may be a terminal configured in communication with a barcode scanner and/or a near field communication (NFC) sensor. In at least some examples, network-enabled device 20 may be a point of sale (POS) device. Remote system 30 may comprise one or more computing devices (e.g., a server(s) or other computing device(s)) effective to perform one or more of the various authentication techniques described in further detail below. In at least some examples, remote system 30 may comprise a memory 32 effective to store data. Further, remote system 30 may sometimes be referred to herein as an "authentication system".

Network-enabled device 20 and remote system 30 may be in communication with one another via a network 64. In some examples, the network 64 is a packet-switched network. For example, below the application layer, the network 64 may operate according to the TCP/IP protocol or another suitable protocol. Any suitable application layer protocol may be used including, for example, HyperText Transfer Protocol (HTTP) or HyperText Transfer Protocol Secure (HTTPS) (e.g., after encrypted data communication has been established). In some examples, the network 64 may be or comprise a Wide Area Network such as, for example, the Internet. In the examples described herein, network-enabled device 20 may be a device with a generally reliable connection the remote system 30 via network 64. In some examples, computing device 10 may communicate with remote system 30 over network 64. However, as represented by the dashed line between computing device 10 and network 64 in FIG. 1, in at least some examples, computing device 10 may have intermittent access to network 64 and remote system 30. Accordingly, the various device authentication techniques described herein are designed to authenticate computing device 10 in scenarios in which computing device 10 has intermittent access to network 64 and/or remote system 30.

The timing diagram 12 shows an example set of messages between computing device 10, network-enabled device 20, and remote system 30 for performing an authentication process effective to authenticate computing device 10 to network-enabled device 20. Computing device 10 may generate a handshake request 40 at a time at which computing device 10 has a connection to network 64 and to remote system 30. In various examples, handshake request 40 may occur when a user of computing device 10 opens an application (or navigates to a particular portion of the application) associated with remote system 30. In at least some examples, the user may authenticate computing device 10 with remote system 30 or with a third party authentication system. In at least some examples, handshake request 40 may be initiated by computing device 10 sending an authentication token to remote system 30. The authentication token may be data identifying computing device 10 and/or an account associated with a user of an application executing on computing device 10.

A handshake process (sometimes referred to herein as a "handshake") between computing device 10 and one or more computing devices of remote system 30 may be a process in which the remote system sends authentication data to the computing device 10. As described in further detail below, the authentication data may comprise a handshake identifier (sometimes referred to in the figures as a "handshake ID") identifying the handshake event.

Remote system 30 may determine whether or not the authentication token is valid. If the authentication token is not valid, remote system 30 may terminate the handshake request 40 and an error message may be displayed on a display of computing device 10. If the authentication token is valid, remote system 30 may retrieve user identification data for computing device 10 and/or the account associated with the user.

As described in further detail below, remote system 30 may generate authentication data. Authentication data may be data used by computing device 10 to generate authentication code data (sometimes referred to herein as an "authentication code"). As described herein, the authentication code data may encode (e.g., in the form of a QR code, one-dimensional barcode, audio code, or some other code) all or a portion of the authentication data received by computing device 10. The authentication code data may be data used to request verification of an action or transaction to be performed by a user account associated with computing device 10. In at least some examples, the authentication code may be a visible representation of data used to request verification of an action or transaction to be performed by a user account associated with computing device 10, as described in further detail below.

The authentication data may be retained by remote system 30 (e.g., stored in a database) and used by remote system 30 to verify an authentication code received from computing device 10. As used herein, authentication data may comprise a handshake identifier, a user ID, an encryption key, a handshake timestamp, a user token, and a set of initialization vectors ("IVs"). The handshake identifier may be a handshake identifier used to identify handshake request 40 from among other handshake events so that remote system 30 may lookup the correct encryption key and set of IVs when validating an authentication code received from computing device 10. The user ID may be user identification data effective to identify a particular user or account holder. The user ID may be too large (in terms of an amount of memory required to store the user ID) to directly encode into a particular format (e.g., a user ID may be too large to encode into a one-dimensional or even two-dimensional barcode). Accordingly, a user token may be randomly generated and may be associated with the user ID. The user token may be smaller in size relative to the user ID so that the user token may be used to generate an authentication code that can be reliably read, scanned, and/or interpreted by network-enabled device 20. The handshake timestamp may be data encoding the time at which the user token and/or handshake identifier were generated by remote system 30. The encryption key and initialization vectors may be stored in memory 32 in association with the handshake identifier and may be sent to computing device 10 so that computing device 10 can encrypt the user token using a particular IV from the set of IVs in conjunction with the encryption key. In some other implementations, the authentication data may comprise the user token, the encryption key, the handshake identifier and a time step value. The time step value may be a configurable amount of time. As described in further detail below, the time step may be used to generate a time counter value. The encryption key may be used to hash the time counter value with the user token to generate a hash token. The handshake identifier may be appended to the hash token and may be used to generate an authentication code to authenticate a user account of computing device 10, as described in further detail below. In various examples, the time step value may relate to an amount of time for which an authentication code generated by computing device 10 is valid. The various authentication data generated by remote system 30 is described below in further detail.

Remote system 30 may store the handshake identifier, user ID data, encryption key, handshake timestamp, user token, and set of initialization vectors ("IVs") in one or more databases in memory 32. Remote system 30 may encrypt the user token, encryption key, and the set of IVs. The encryption key, user token, handshake identifier, and the set of IVs may be sent to computing device 10 and may be stored in the repository of security certificates (also referred to as a "keystore") of computing device 10. In various examples, the keystore may be password protected. In various examples, the encryption key, user token, handshake identifier, and the set of IVs may be encrypted prior to storing in the keystore of computing device 10.

A user of computing device 10 may desire to perform an action accessible via network-enabled device 20. Prior to performing the action network-enabled device 20 may request authentication of computing device 10 and/or of a user account associated with a user of computing device 10. Examples of actions may include initialization of a download, provision of security access, entry into a secured transaction, etc. Accordingly, using the various data received from remote system 30 during handshake request 40, computing device 10 may be effective to generate a code at action 50 that may be sent to network-enabled device 20 at action 60. In various examples, the code may be sent to network-enabled device 20 by displaying the code on a display of computing device 10 that is read by a scanner or other reader of network-enabled device 20. The code may be effective to authenticate computing device 10 (or an account associated with a user of computing device 10) to network-enabled device 20, so that the desired action may be undertaken. Provided that the authentication data sent from remote system 30 to computing device 10 during handshake request 40 is valid and has not timed out, computing device 10 does not require an active connection to network 64 in order to authenticate computing device 10 and/or a user account associated with a user of computing device 10. The generation of the code at action 50 is described in further detail below in reference to FIG. 5.

At action 60, computing device 10 may send the code generated at action 50 to network-enabled device 20. In various examples, the code generated at action 50 may be a visual code displayed on a display of computing device 10. In such scenarios, network-enabled device 20 may be effective to scan the code using, for example, a QR code scanner or a one-dimensional barcode scanner. In various other examples, the code may be sent to network-enabled device 20 using NFC, Bluetooth, sonic signals and/or various other short-range communication methods. In at least some other examples, the code generated at action 50 may be sent to network-enabled device 20 via network 64.

At action 70, network-enabled device 20 may send the code received from computing device 10 over network 64 to remote system 30. At action 80, remote system 30 may verify the code received from network-enabled device 20. Verification of the code is described in further detail below in reference to FIG. 5. Upon successful verification of the code, at action 90, remote system 30 may send a message to network-enabled device 20 over network 64 indicating that the authentication was successful. Accordingly, network-enabled device 20 may allow computing device 10 and/or a user of computing device 10 to perform the desired action.

Figure 2:
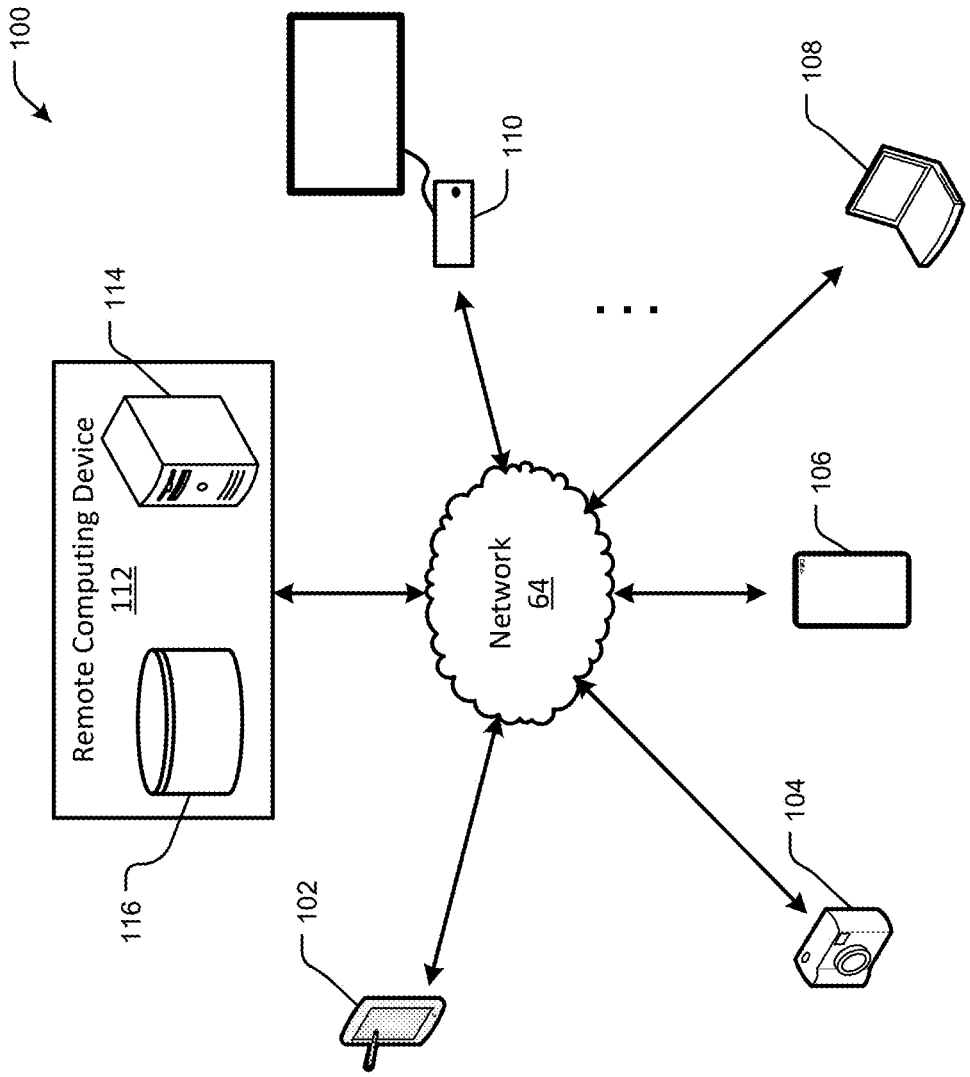
FIG. 2 is a diagram showing one example of an environment for authenticating devices in accordance with the various embodiments described herein.

FIG. 2 is a diagram showing one example of an environment 100 for establishing encrypted data communication between devices utilizing a password authenticated exchange. The environment 100 includes several example computing devices that may be and/or may execute one or more of the computing device 10, the network-enabled device 20, and/or one or more components of remote system 30. Environment 100 may comprise one or more of the various devices shown herein. In at least some examples, environment 100 may comprise more or fewer devices than shown in FIG. 2. The example computing devices 102, 104, 106, 108, 110, 112 shown in FIG. 2 are in communication with one another via the network 64. Although, as described above in reference to FIG. 1, computing device 10 of FIG. 1 may not be required to have a reliable internet connection in order to authenticate computing device 10 to network-enabled device 20 (depicted in FIG. 1). The computing devices 102, 104, 106, 108, 110, 112 may also be in communication with other computing devices 102, 104, 106, 108, 110, 112 via an alternate communication medium, such as via NFC, Bluetooth, various infrared scanning techniques, audio signals, etc. Although particular computing devices 102, 104, 106, 108, 110, and 112 are depicted in FIG. 2 and described below, different types of computing devices may be used without departing from the spirit of the disclosure. For example, any computing devices configured to communicate with other computing devices over a network may be used in accordance with the protocols, systems, and methods described herein.

An example terminal 110 may be connected to a barcode scanner or NFC sensor for detection of an authentication code generated using the various techniques described herein. The terminal 110 may comprise a processor and associated data storage. The terminal 110 may also comprise suitable input/output devices such as, switches or buttons for activating and/or configuring the terminal 110, a display for displaying a status of the terminal 110, etc. The terminal 110, in some examples, may store data and/or may download data from a remote computing device, such as remote computing device 112. In some examples, data stored and/or downloaded to the terminal 110 may be displayed at a suitable output device. In at least some cases, terminal 110 may be an example of a network-enabled device 20, shown and described above in reference to FIG. 1. In various examples, terminal 110 may be at a fixed physical location or may be a portable device, such as a tablet computer or handheld scanning device. In some examples, terminal 110 may be effective to receive authentication codes from one or more of devices 102, 104, 106 and/or 108 via a short-range communication technique, such as by, for example, scanning a barcode displayed on a display of one or more of devices 102, 104, 106, and/or 108 and/or by receiving a signal comprising an authentication code from one or more of devices 102, 104, 106, and/or 108.

Terminal 110 may be effective to send the authentication code to one or more remote computing devices 112. Remote computing device 112 may comprise one or more processors 114 and/or one or more memories 116. In various examples, the remote computing device 112 may provide, in whole or in part, remote system 30 described above in reference to FIG. 1. Remote system 30 may be effective to validate the authentication code received from terminal 110 and may send a confirmation message to terminal 110 upon a successful authentication. Additionally, as described in further detail below, remote computing devices 112 may be effective to exchange data with one or more of devices 102, 104, 106, and/or 108 over network 64 during a handshake request in order to send data used to generate an authentication code to devices 102, 104, 106, and/or 108.

A tablet computing device 102 may be a example of computing device 10 (FIG. 1) that may be authenticated (or that may be used to authenticate a user) in accordance with the various embodiments described herein. Tablet computing device 102 may comprise one or more processors, a memory, and a display. In various examples, tablet computing device 102 may comprise one or more buttons or switches that allow a user to input commands. In some examples, tablet computing device 102 may comprise a touchscreen display allowing a user to input commands.

An example digital camera computing device or digital camera 104 may be any suitable device configured to capture an image and/or video. The digital camera 104 may have one or more than one image sensor and may have a standard or panoramic field-of-view. In some examples, the digital camera 104 may be configured to communicate with other components of the environment 100 via the network 64 and/or via an alternate communication medium. For example, the digital camera 104 may upload images and/or videos to remote computing device 112 or other component of the environment 100 for storage, processing, etc. In some examples, digital camera 104 may be a example of computing device 10 (FIG. 1) that may be authenticated (or that may be used to authenticate a user) in accordance with the various embodiments described herein. In various other examples, digital camera 104 may be an example of a network-enabled device 20 (FIG. 1) effective to receive an authentication code from a computing device and to communicate with a web service and/or remote system 30 over network 64 to authenticate the computing device and/or a user thereof.

An example mobile device 106 may be any suitable type of computing device comprising a processor and data storage. In some examples, the mobile device 106 may comprise one or more image sensors and associated optics for capturing an image or video. In some examples, the mobile device 106 may be configured to communicate on a cellular or other telephone network in addition or instead of the network 64. Also, in some examples, the mobile device 106 may be configured to access the network 64 via the cellular or other telephone network. An example other computing device 108 may be any suitable type of computing device comprising a processor and data storage including, for example, a laptop computer, a desktop computer, etc. In some examples, the computing device 108 may comprise one or more image sensors and associated optics for capturing an image or video. In some examples, mobile device 106 and/or other computing device 108 may be examples of computing devices 10 (FIG. 1) that may be authenticated (or that may be used to authenticate a user) in accordance with the various embodiments described herein.

Figure 3:
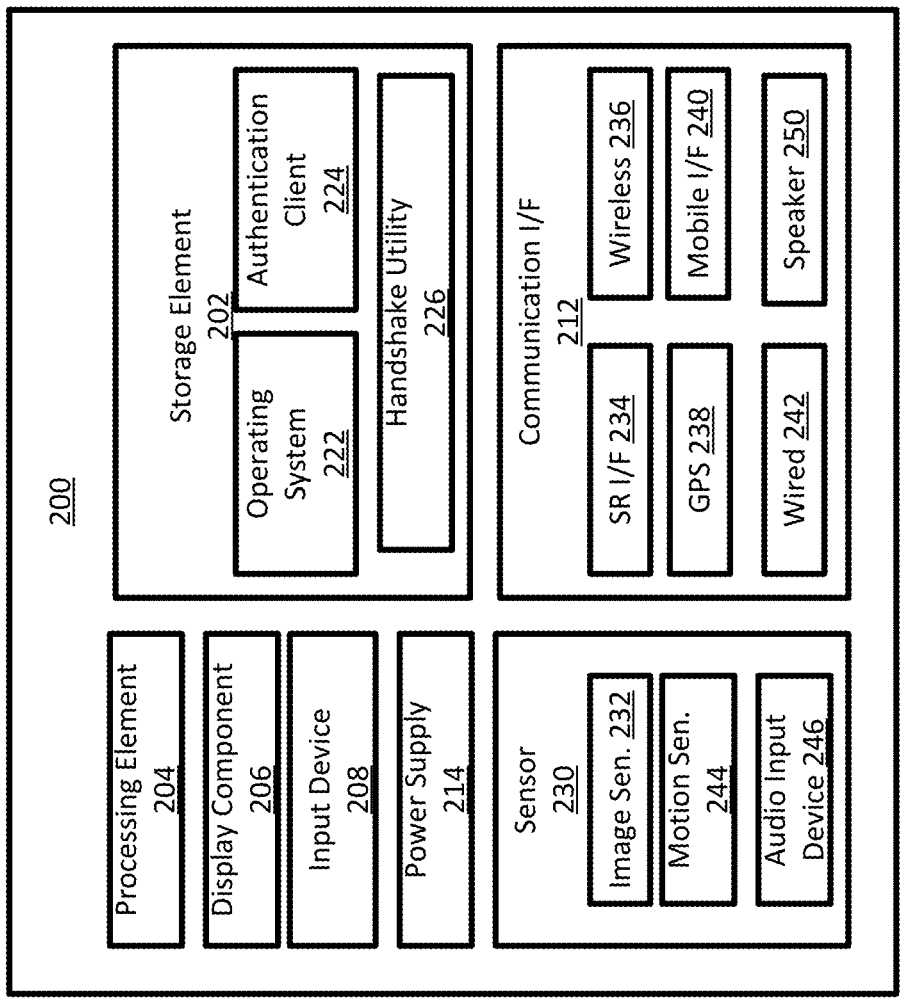
FIG. 3 is a block diagram showing an example architecture of a computing device, in accordance with various aspects of the present disclosure.

FIG. 3 is a block diagram showing an example architecture 200 of a computing device such as computing device 10, a network-enabled device 20, and/or a computing device providing remote system 30. For example, the architecture 200 may describe some or all of the computing devices of the environment 100. In some examples, the computing devices of the environment 100 may be referred to herein as display devices, input devices, and/or output devices. It will be appreciated that not all computing devices will include all of the components of the architecture 200 and some computing devices may include additional components not shown in the architecture 200.

The architecture 200 may include one or more processing elements 204 for executing instructions and retrieving data stored in a storage element 202. The processing element 204 may comprise at least one processor. Any suitable processor or processors may be used. For example, the processing element 204 may comprise one or more digital signal processors (DSPs). The storage element 202 can include one or more different types of memory, data storage or computer readable storage media devoted to different purposes within the architecture 200. For example, the storage element 202 may comprise flash memory, random access memory, disk-based storage, etc. Different portions of the storage element 202, for example, may be used to store program instructions for execution by the processing element 204, storage of frames or other digital works, and/or a removable storage for transferring data to other devices, etc. An operating system 222 may provide the user with an interface for operating the computing device and may facilitate communications and commands between applications executing on the architecture 200 and various hardware thereof. An authentication client 224 may be programmed to authenticate a computing device 10 (FIG. 1) and/or a user of a computing device 10, as described herein. For example, the authentication client 224 may be programmed to receive the authentication code from a network-enabled device, as described herein. Further, authentication client 224 may be programmed to verify the authentication code. Further, the authentication client 224 may be programmed to generate the various messages described herein in relation to authentication of computing device 10 and/or a user of computing device 10. Also, in some examples, the storage element 202 may comprise instructions for executing a handshake utility 226 for generating the handshake identifier, user ID, encryption key, handshake timestamp, user token, and/or set of IVs, as described herein.

When implemented in some computing devices, such as a display device, the architecture 200 may also comprise a display component 206. The display component 206 may comprise one or more light emitting diodes (LEDs) or other suitable display lamps. Also, in some examples, the display component 206 may comprise, for example, one or more devices such as cathode ray tubes (CRTs), liquid crystal display (LCD) screens, gas plasma-based flat panel displays, LCD projectors, or other types of display devices, etc.

The architecture 200 may also include one or more input devices 208 operable to receive inputs from a user. The input devices 208 can include, for example, a push button, touch pad, touch screen, wheel, joystick, keyboard, mouse, trackball, keypad, light gun, barcode scanner, game controller, microphone or any other such device or element whereby a user can provide inputs to the architecture 200. These input devices 208 may be incorporated into the architecture 200 or operably coupled to the architecture 200 via wired or wireless interface. When the display component 206 includes a touch sensitive display, the input devices 208 can include a touch sensor that operates in conjunction with the display component 206 to permit users to interact with the image displayed by the display component 206 using touch inputs (e.g., with a finger or stylus). The architecture 200 may also include a power supply 214, such as a wired alternating current (AC) converter, a rechargeable battery operable to be recharged through conventional plug-in approaches, or through other approaches such as capacitive or inductive charging.

The architecture 200 may also include a communication interface 212, comprising one or more wired or wireless components operable to communicate with one or more other user devices. For example, the communication interface 212 may enable the computing device 200 to communicate via the network 64. The communication interface 212 may comprise a wireless communication module 236 configured to communicate on a network, such as the network 64, according to any suitable wireless protocol, such as IEEE 802.11 or another suitable wireless local area network WLAN protocol. A short range interface 234 may be configured to communicate using one or more short range wireless protocols such as, for example, near field communications (NFC), Bluetooth, Bluetooth LE, barcode scanning, etc. A mobile interface 240 may be configured to communicate utilizing a cellular or other mobile protocol. A Global Positioning System (GPS) module 238 may be in communication with one or more earth-orbiting satellites or other suitable position-determining systems to identify a position of the architecture 200. A wired communication module 242 may be configured to communicate according to the Universal Serial Bus (USB) protocol or any other suitable protocol. In various examples, the communication interface 212 may include a speaker 250. Speaker 250 may be effective to produce sonic signals at various frequencies. In some examples, speaker 250 may produce audible, subsonic, and/or ultrasonic signals used to send and/or receive an authentication code.

The architecture 200 may also include one or more sensors 230 such as, for example, one or more image sensors and one or more motion sensors. Some examples of the architecture 200 may include multiple image sensors 232. In some examples, one or more image sensors 232 may capture video data. Motion sensors 244 may include any sensors that sense motion of the architecture including, for example, gyroscopes and accelerometers. A gyroscope may be configured to generate a signal indicating rotational motion and/or changes in orientation of the architecture (e.g., a magnitude and/or direction of the motion or change in orientation). Any suitable gyroscope may be used including, for example, ring laser gyroscopes, fiber-optic gyroscopes, fluid gyroscopes, vibration gyroscopes, etc. An accelerometer may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 238 may be utilized as a motion sensor. For example, changes in the position of the architecture 200, as determined by the GPS interface 238, may indicate the motion of the GPS interface 238. Other types of motion sensors that may be included in the architecture 200 include digital compass sensors, other location sensors (e.g., utilizing beacon signals or time stamps to determine a current or past location of the architecture), time-of-flight or other depth sensors, etc. In some examples, an image sensor may also be a motion sensor. In addition to motion sensors, some examples of the architecture 200 include an audio input device 246. In various examples, audio input device 246 may be a microphone or other audio transducer. For example, when the architecture 200 is or is executing a network-enabled device 20, the audio input device 246 may receive a signal with the authentication code modulated thereon. The processing element 204 may be programmed to demodulate the received signal to determine the authentication code before sending the authentication code to remote system 30 (FIG. 1).

Figure 4:
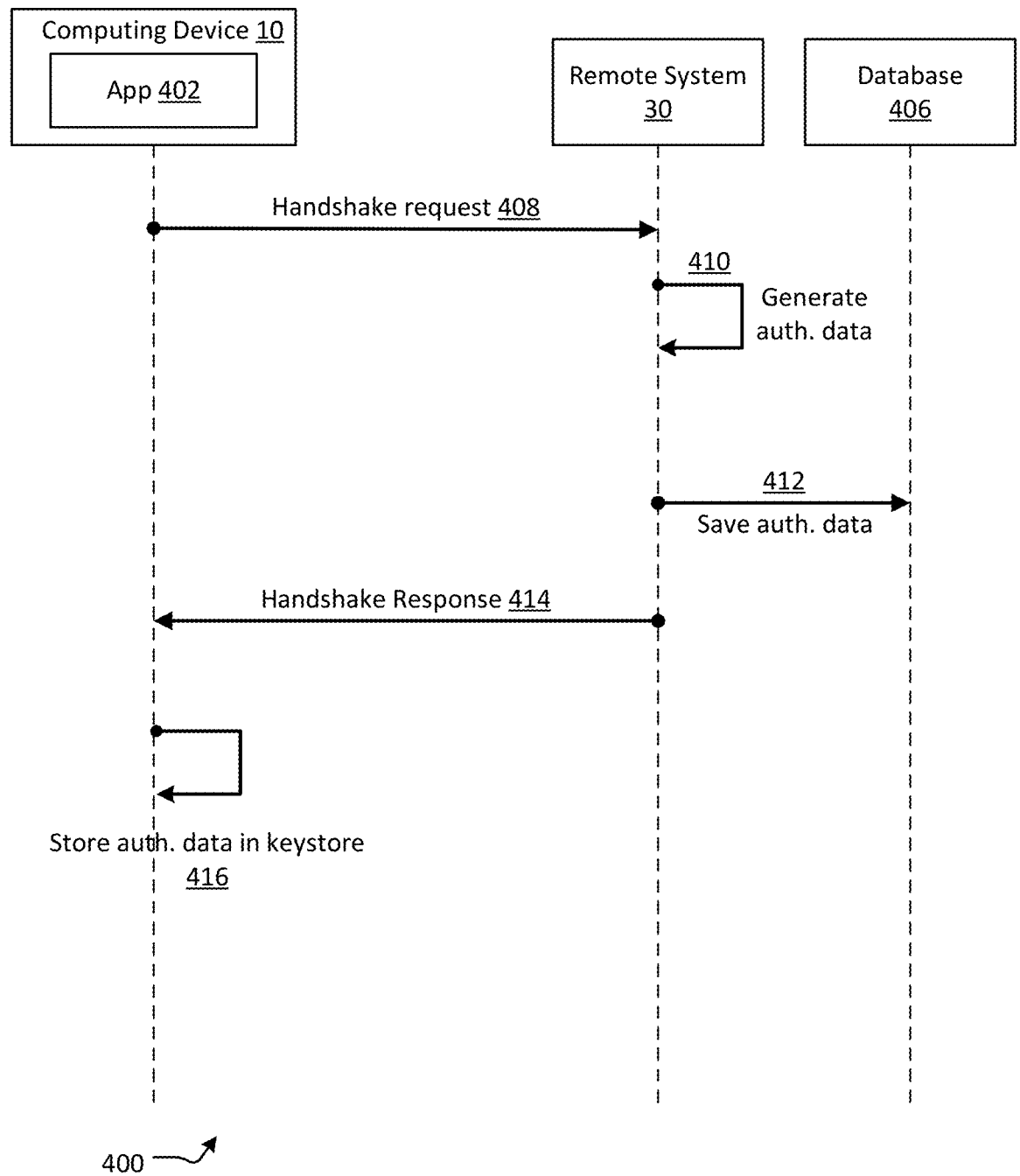
FIG. 4 is timing diagram showing an example process for performing device and/or user authentication, in accordance with various aspects of the present disclosure.

FIG. 4 is timing diagram 400 showing an example sequence of events to perform device and/or user authentication, in accordance with various aspects of the present disclosure. FIG. 4 provides additional detail regarding messages and actions occurring during handshake request 40 depicted in FIG. 1. In the example, timing diagram 400, application 402 may represent an application executing on computing device 10.

In various examples, prior to performing one or more of the actions depicted in FIG. 4, a user of computing device 10 may log into a user account in application 402. For example, the user may log into a user account using a username and password and/or using two factor authentication. After the user has logged into the user account, application 402 may send handshake request 408 to remote system 30 upon a user of computing device 10 opening application 402 during a time at which computing device 10 is connected to network 64 (e.g., while computing device 10 is connected to the internet). Handshake request 408 may comprise an authentication token effective to authenticate application 402 (and/or a user account of application 402) to remote system 30.

Figure 6A:
FIGS. 6A-6G depict variation representations of authentication data that may be used to perform device and/or user authentication, in accordance with various aspects of the present disclosure.

At action 410, remote system 30 may retrieve the user ID data associated with the authentication token and may generate authentication data. As used herein, authentication data may refer to user ID data, an encryption key, a handshake timestamp, a user token (associated with the user ID data by remote system 30), handshake identifier data, and a set of IVs. In various examples, the user ID data may identify the user account logged into application 402 during handshake request 408. In some examples, the user ID data may be too large (in terms of an amount of memory required to store the user ID data) to be encoded into a desired form of authentication code. For example, a user ID data may be approximately 28 bytes. The desired form of the authentication code may be a one-dimensional barcode. It may not be possible to represent 28 bytes using a standard one-dimensional barcode that is of an acceptable length. Accordingly, remote system 30 may generate a user token and associate the user token with the user ID data (e.g., in database 406). As depicted in FIG. 6A, the user token may be an encoded representation of the user ID data or may be randomly generated and associated with the user ID. In the example depicted in FIG. 6A, an example user token is represented in Base64 bytes. In some other implementations, the authentication data may comprise the user token, a time step value, the encryption key, and the handshake identifier.

The handshake identifier data may identify the current handshake engaged in between application 402 and remote system 30 from among other handshakes. The handshake timestamp may encode a time at which the user token and handshake identifier were generated at action 410. The encryption key may be, for example, a symmetric encryption key used to encrypt and decrypt the user token using one of the IVs from the set of IVs. The set of IVs may comprise any number of IVs. In some examples, each IV in the set of IVs may only be valid for a single encryption of a user token.

At action 412, remote system 30 may save the authentication data in a database 406. Database 406 may be stored in memory 32 shown and described in reference to FIG. 1. The handshake identifier, handshake timestamp, user ID, user token, encryption key and set of IVs may be stored in database 406 with a particular time to live (TTL) value. Any appropriate TTL data may be used. In some examples, the TTL data may be 15 days, 2 days, 25 days, one calendar month, 3 hours, etc. If the time step value implementation described above is used, remote system 30 may store the time step value in database 406 in association with the handshake identifier.

At action 414, the user token, encryption key, handshake identifier, and IV set may be sent to computing device 10. At action 416, computing device 10 (and/or application 402) may store the user token, encryption key, handshake identifier, and IV set in a keystore of computing device 10. In some examples, a time at which the handshake identifier is stored in the keystore may be stored in a memory of computing device 10. In other examples, the handshake timestamp may be sent at action 414 to computing device 10 and stored in the keystore in association with the handshake identifier.

Handshake Refresh

When a user of computing device 10 opens application 402, application 402 may determine whether or not a handshake identifier is stored in the hardware keystore of computing device 10. If no handshake identifier is stored in the hardware keystore, application 402 may execute the handshake described above in reference to FIG. 4. If the handshake timestamp for a handshake identifier stored within the hardware keystore indicates that the handshake identifier has been stored for greater than a predetermined threshold amount of time (e.g., 80% of the TTL data or any other suitable percentage), application 402 may trigger a new handshake procedure, as described above in reference to FIG. 4. In another example, if the handshake identifier has not been stored for greater than the predetermined threshold amount of time, but greater than a threshold percentage of the IVs have been indicated as "used" (indicating that the used IVs have been used to encrypt the user token), application 402 may trigger a new handshake procedure, as described above in reference to FIG. 4. Alternatively, if the handshake identifier has not been stored for greater than the predetermined threshold amount of time and less than the threshold percentage of the IVs are indicated as "used", no action may be taken.

Additionally, remote system 30 may determine that the TTL data for a particular handshake identifier has expired. Upon determining that the handshake identifier has not been refreshed prior to expiration of the TTL, remote system 30 may expire the set of IVs for the expired handshake identifier and may send a push notification to computing device 10. Upon receipt of the push notification, computing device 10 may initiate a new handshake using, for example, the process described herein in reference to FIG. 4. In various examples, the push notification may be sent over network 64 during a time at which computing device 10 is connected to network 64.

Figure 5:
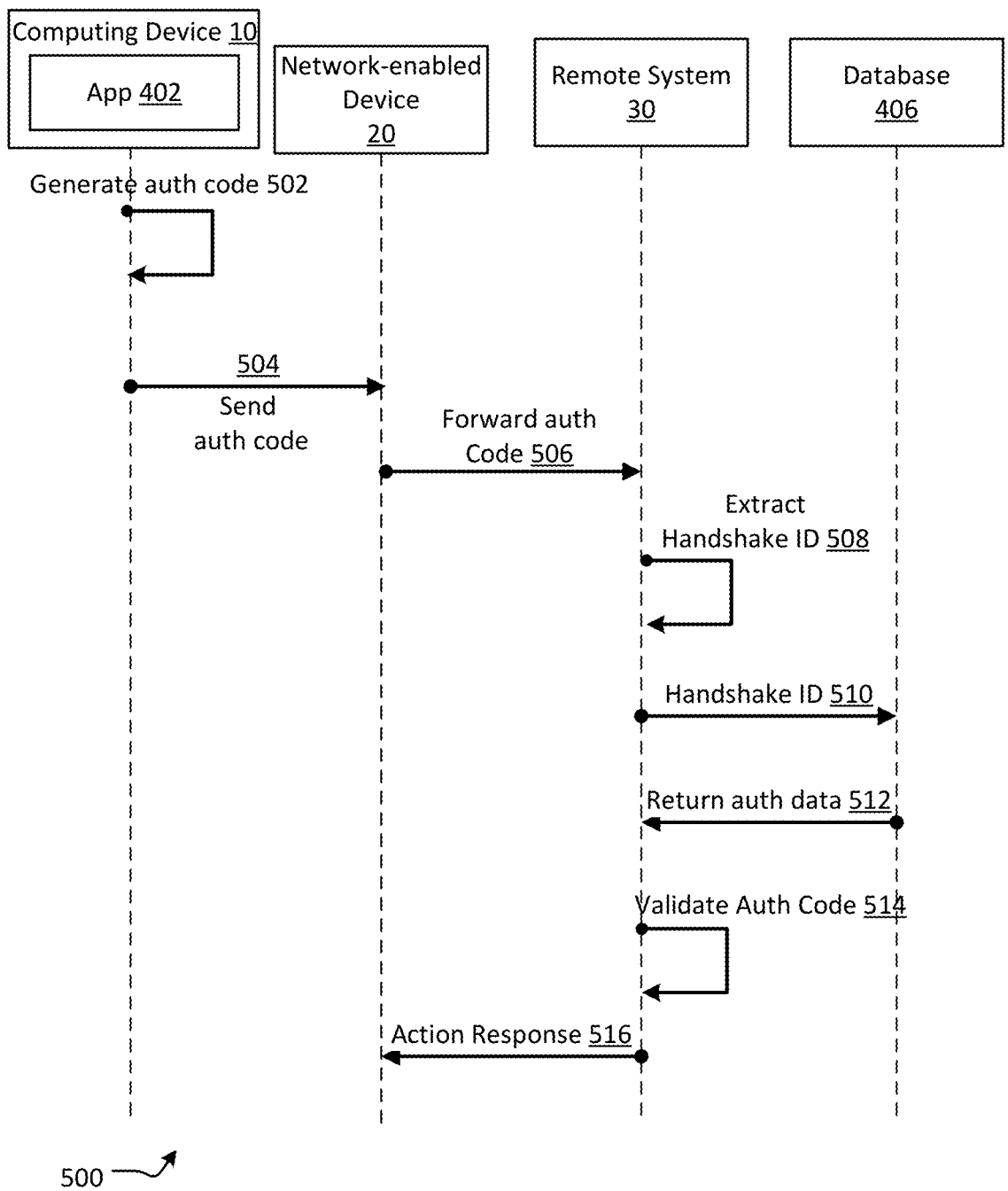
FIG. 5 is a timing diagram showing an example process for performing device and/or user authentication, in accordance with various aspects of the present disclosure.

FIG. 5 is timing diagram 500 showing an example sequence of events to perform device and/or user authentication, in accordance with various aspects of the present disclosure. The description below provides additional detail regarding generation of an authentication code by computing device 10, sending the authentication code from computing device 10 to network-enabled device 20, sending the authentication code from network-enabled device 20 to remote system 30, and validation of the authentication code by remote system 30.

A user of computing device 10 may desire that one or more actions be performed by a user and/or administrator of network-enabled device 20. For example, a user may request access to a secure area. In order to authorize access to the secure area, network-enabled device 20 may require that the user be authenticated. Accordingly, the user may generate an authentication code at action 502, using the various techniques described below. The authentication code may be sent to the network-enabled device 20 at action 504. For example, the authentication code may be a barcode or QR code displayed on a display of computing device 10. The network-enabled device 20 may scan the QR code. In various other examples, the authentication code may be sent to network-enabled device 20 at action 504 using NFC or another short range communication technique. In another example, the authentication code may be sent to network-enabled device 20 at action 504 using an audio signal. Provided that network-enabled device 20 is effective to communicate with remote system 30 over network 64, computing device 10 is not required to maintain an internet connection in order to perform the authentication shown and described in reference to FIG. 5. For example, computing device 10 may perform the various authentication techniques described herein even if computing device 10 has no current network connection to one or more servers of remote system 30 (e.g., such as when a mobile device lacks a data connection to the internet) provided that computing device 10 has valid handshake data (e.g., authentication data that has not timed out).

In some examples, at action 502, in order to generate an authentication code, a user of computing device 10 may navigate to a particular portion of application 402 or may input a particular command to cause application 402 to generate an authentication code. In at least some examples, the user may be able to cause application 402 to generate an authentication code using a voice command. In various examples, at action 502, in order to generate an authentication code, computing device 10 may receive a request to enter into a transaction and/or an authentication session with internet-enabled device 20.

Figure 6B:
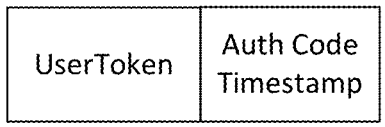

Upon receiving an instruction to generate an authentication code, application 402 and/or computing device 10 may retrieve the user token, encryption key, IV set and handshake identifier from the hardware keystore of computing device 10. Application 402 may generate authentication code timestamp data based on the current time. As shown in FIG. 6B, the authentication code timestamp data may be included in the payload of the authentication code. In some examples, in order to minimize the size of the authentication code, the authentication code timestamp data may be represented using as few as 3 bytes. For example, 9 bits may be used to encode the day (to encode 366 possible days of the year), 5 bits may be used to encode the hour (to encode 24 possible hours of the day), 6 bits may be used to encode the minute (to encode 60 possible minutes of the hour).

If the time step value (sometimes referred to herein as "time step data") implementation described above is used, at action 502, computing device 10 may generate a time counter value (sometimes referred to herein as "timeCounter" or "time counter data"). The time counter value may be generated by determining a time difference value. The time difference value may be the difference between the current time and the time at which the most recent handshake process was performed. The time counter value may be generated by dividing the time difference value by the time step value stored in the keystore. As depicted in FIG. 6F, the time counter value and the user token (depicted in FIG. 6E) may be hashed together using the encryption key to generate a hash token (as shown in FIG. 6F). At action 502, the authentication code may be generated by appending the handshake identifier to the hash token. As depicted in FIG. 6G, the handshake identifier may be appended to the hash token to generate the authentication code.

In examples using IV-based encryption, the authentication code timestamp may be used to prevent reuse of the same user token at a later time (e.g., if the authentication code is stolen). For example, the authentication codes may be valid for a limited amount of time. For example, authentication codes may be valid for 2 minutes, 3 minutes, 5 minutes, 10 minutes, 45 seconds, or some other suitable amount of time. Remote system 30 may use the authentication code timestamp to determine if the authentication code was generated within the required timeframe at action 514, as described in further detail below.

Figure 6C:
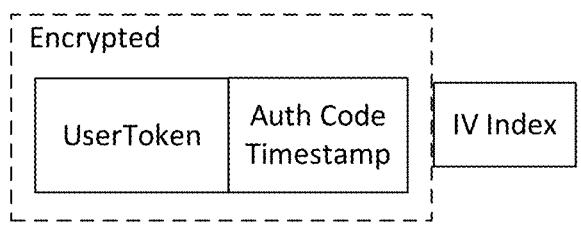

As shown in FIG. 6C, the encryption key and one of the IVs (of the set of IVs) are used to encrypt the user token and authentication code timestamp to generate an encrypted token and encrypted timestamp in a payload of the authentication code. Encryption of the user token and the authentication code timestamp prevents a would-be thief from stealing the user token and appending a new, valid timestamp to the payload. As shown in FIG. 6C, the IV index value is used to specify the particular IV of the set of IVs used to encrypt the user token and authentication code timestamp. Encoding the IV index as opposed to the particular IV used to encrypt the payload provides added security and additionally reduces the size of the payload of the authentication code generated at action 502. In various examples, it may be beneficial to maintain a relatively small size for the authentication code generated at action 502. The larger the size (in terms of an amount of memory required to store the authentication code) of the authentication code, the more informationally dense a resulting one-dimensional barcode or QR code may be. Network-enabled device 20 may have trouble reliably reading authentication codes that are above a certain level of informational density, particularly when network-enabled device is an older one-dimensional barcode scanner or QR scanner. As such, encoding the IV index as opposed to the IV used in encryption may reduce the number of scanning errors related to sending the authentication code to network-enabled device 20 at action 504.

Figure 6D:
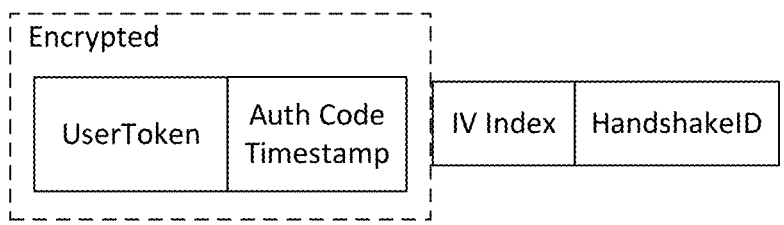
Figure 6E:
Figure 6F:
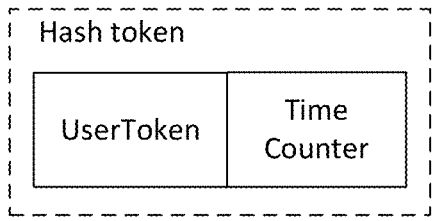
Figure 6G:
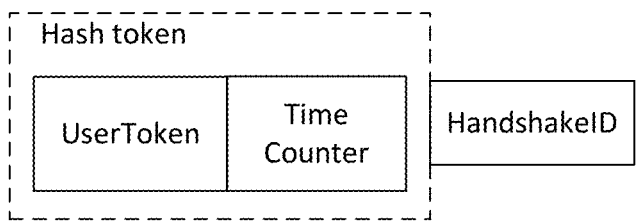

A different encryption key and set of IVs may be used for each handshake identifier. Accordingly, as shown in FIG. 6D, the handshake identifier is appended to the authentication code so that remote system 30 may determine the correct set of IVs and encryption key to use to decrypt the authentication code. The authentication code may be used to generate a barcode, QR code, modulated signal, etc. In various examples, the authentication code may be less than 20 bytes. At action 504, the authentication code may be sent to network-enabled device 20. For example, network-enabled device 20 may scan a barcode on a display of computing device 10. In such an example, computing device 10 need not be connected to the internet in order to generate the authentication code and be authenticated by remote system 30.

At action 506, network-enabled device 20 may send the authentication code received from computing device 10 to remote system 30. In various examples, network-enabled device 20 may have a reliable internet connection and may send the authentication code to remote system 30 via network 64. In various examples, network-enabled device 20 may establish a secure communication channel with remote system 30 prior to sending the authentication code.

At action 508, remote system 30 may receive the authentication code from network-enabled device 20 and may extract the handshake identifier. At action 510, remote system 30 may use the handshake identifier as a search query to return the authentication data stored in database 406 in association with the handshake identifier at action 512. In some examples, the authentication data may comprise the user ID, encryption key, user token, and the set of IVs. In some other implementations, the authentication data may comprise the user token (e.g., the one-time use token), the encryption key, the handshake identifier and a time step value. At action 514 remote system 30 may validate the authentication code received from network enabled device 20. For example, remote system 30 may use the IV index received from network-enabled device 20 as a part of the authentication code to select the corresponding IV from the set of IVs retrieved from database 406. Remote system 30 may use the encryption key from the database 406 and the IV corresponding to the IV index to decrypt the payload of the authentication code and extract the authentication code timestamp data and the user token. Remote system 30 may verify that the extracted user token matches (e.g., comprises the same data) the user token retrieved from database 406. Additionally, remote system 30 may validate that the authentication code timestamp data was generated within the required timeframe (e.g., that the authentication code was generated by application 402 within a threshold amount of time of a receipt time at which the authentication code was received by remote system 30), as described above in reference to FIG. 5. In at least some examples, remote system 30 may allow an additional buffer amount of time when validating the authentication code timestamp to account for latency. For example, if authentication code timestamps are specified to be valid for 2 minutes from generation before expiring, remote system 30 may determine whether or not a received authentication code timestamp was received within the past 3 minutes in order to account for latency on a communication link between network enabled device 20 and remote system 30 and/or for latency in computation time at one or more computing devices providing remote system 30. In the example above, remote system 30 verifying that the extracted user token matches the user token retrieved from database 406 may comprise comparing the bit values of the extracted user token with the bit values of the user token retrieved from database 406 to determine if the bit values of the two user tokens are the same.

In examples where the authentication data stored in database 406 comprises a time step value, remote system 30 may use the encryption key, time step value and user token retrieved from database 406 to independently generate a hash token using the current time. The current time may be divided by the time step value to determine a time counter value. The encryption key may be used to hash the user token and the time counter value to generate the hash token. In such an example, general time servers may be used to synchronize times used by computing device 10 and remote system 30. Remote system 30 may compare the independently-generated hash token with the hash token received as part of the authentication code from network-enabled device 20 to determine whether or not the hash tokens match. If the hash tokens match, the user computing device may be authenticated to network-enabled device 20. Additionally, one time step value prior to the current time may be used to accommodate latency between time of generation of the authentication code on computing device 10 and the authentication code reaching remote system 30.

In some further examples, remote system 30 may be effective to determine whether or not the authentication code being validated at action 514 has been used more than a threshold number of times (to prevent fraudulent authentications). For example, remote system 30 may determine whether the authentication code being validated at action 514 has been used more than 5 times during the validity of the authentication code as defined by the authentication code timestamp. If the authentication code has been used greater than the threshold number of times, remote system 30 may send a response to network-enabled device 20 at action 516 to decline the requested action. Conversely, if the authentication code is successfully validated at action 514 within the required timeframe (e.g., 2 minutes, 3 minutes, 5 minutes, or any suitable amount of time) and the authentication code has been used less than the threshold number of times, the response generated by remote system 30 at action 516 may indicate a successful validation. The response may be sent to network-enabled device 20 over network 64. Accordingly, computing device 10 and/or a user or user account associated with computing device 10 may be successfully validated to network-enabled device 20 by remote system 30. As such, network-enabled device 20 may authorize computing device 10 and/or a user of computing device 10 to perform the requested action.

Figure 7:
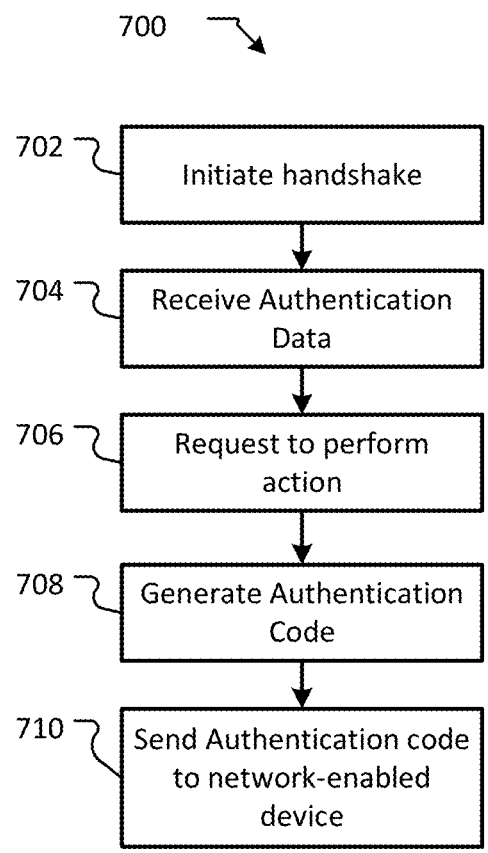
FIG. 7 is a flow chart showing an example process that may be executed by a computing device to provide device and/or user authentication, in accordance with various aspects of the present disclosure.

FIG. 7 is a flow chart showing one example of a process flow 700 that may be executed by a computing device (e.g., computing device 10) to provide device and/or user authentication, in accordance with various aspects of the present disclosure. The actions of the process flow 700 may represent a series of instructions comprising computer readable machine code executable by a processing unit of a computing device. In various examples, the computer readable machine codes may be comprised of instructions selected from a native instruction set of the computing device and/or an operating system of the computing device.

The process flow 700 of FIG. 7 may begin at action 702, "Initiate handshake". At action 702, a computing device (such as computing device 10 of FIG. 1) may establish a network connection with a web system (e.g., remote system 30 of FIG. 1). In at least some examples, the network connection may be established in response to a user of the computing device opening an application associated with the web system. In various examples, a user of the computing device may log in to the application using account credentials, two factor authentication and/or some other method of authentication. Thereafter, the user computing device may establish an authenticated session with the web system.

The process flow 700 of FIG. 7 may continue from action 702 to action 704, "Receive Authentication data". At action 704, the computing device (e.g., computing device 10) may receive authentication data from the web system (e.g., remote system 30). In various examples, authentication data may comprise a handshake identifier, a user ID, an encryption key, a handshake timestamp, a user token, and a set of initialization vectors ("IVs"). The handshake identifier may identify the handshake from handshake request 40 from among other handshakes so that remote system 30 may lookup the correct encryption key and set of IVs when validating an authentication code received from computing device 10. The user ID may be user identification data effective to identify a particular user or account holder. The user ID may be too large (in terms of an amount of memory required to store the user ID) to directly encode into a particular format (e.g., a user ID may be too large to encode into a barcode). Accordingly, a user token may be randomly generated by remote system 30 and may be associated with the user ID. The user token may be smaller in size relative to the user ID so that the user token may be used to generate an authentication code that can be reliably read, scanned, and/or interpreted by network-enabled device 20. The handshake timestamp may be data encoding the time at which the user token and/or handshake identifier were generated by remote system 30. The encryption key and initialization vectors may be stored in memory 32 in association with the handshake identifier and may be provided to computing device 10 so that computing device 10 can encrypt the user token using a particular IV from the set of IVs. In some other examples, the authentication data may comprise the user token, handshake identifier, encryption key and a time step value. The received authentication data may be encrypted and stored in a keystore of the computing device.

The process flow 700 of FIG. 7 may continue from action 704 to action 706, "Request to perform action". At action 706, the computing device and/or an application on the computing device may receive a request to perform an action. In various examples, the action may include authenticating a particular user of an account, authenticating a transaction, etc. In some examples, the request to perform the action may be initiated by navigating to a particular portion or module of an application executing on computing device 10 that is associated with remote system 30. For example, the portion or module of the application may be programmed to generate an authentication code for validation of the user, the user account and/or the computing device 10.

The process flow 700 of FIG. 7 may continue from action 706 to action 708, "Generate Authentication Code". At action 708, the computing device (e.g., computing device 10) may be effective to generate an authentication code used to validate the computing device and/or a user of the computing device to a network-enabled device and/or to an entity associated with the network-enabled device. Upon receiving an instruction to generate an authentication code, application 402 (FIG. 4) and/or computing device 10 may retrieve the user token, encryption key, IV set and handshake identifier from the hardware keystore of computing device 10. Application 402 may generate an authentication code timestamp based on the current time. As shown in FIG. 6B, the authentication code timestamp may be included in the payload of the authentication code. In some examples, in order to minimize the size of the authentication code, the authentication code timestamp may be represented using as few as 3 bytes. For example, 9 bits may be used to encode the day (to encode 366 possible days of the year), 5 bits may be used to encode the hour, 6 bits may be used to encode the minute. If the time step value implementation described above is used, computing device 10 may generate the time counter value by dividing the difference between the current time and the time at which the most recent handshake process was performed by the time step value stored in the keystore. The time counter value and user token may be hashed together to generate a hash token. The authentication code may be generated by appending the handshake identifier to the hash token.

The process flow 700 of FIG. 7 may continue from action 708 to action 710, "Send authentication code to network-enabled device". At action 710, the authentication code may be sent to the network-enabled device (e.g., network-enabled device 20 of FIG. 1). As previously described, in various examples, computing device 10 need not have an internet connection at the time that the authentication code is sent to network-enabled device 20. For example, computing device 10 may send the authentication code to network-enabled device 20 by displaying a code on a display of computing device 10 (e.g., a barcode or a QR code). In various other examples, computing device 10 may send authentication code to network-enabled device 20 using various other forms of communication, such as NFC, Bluetooth, audio signals, WiFi or any other suitable means of communication. Network-enabled device 20 may, in turn, send the authentication code to remote system 30 for validation of the computing device 10 and/or a user associated with the computing device 10.

Figure 8:
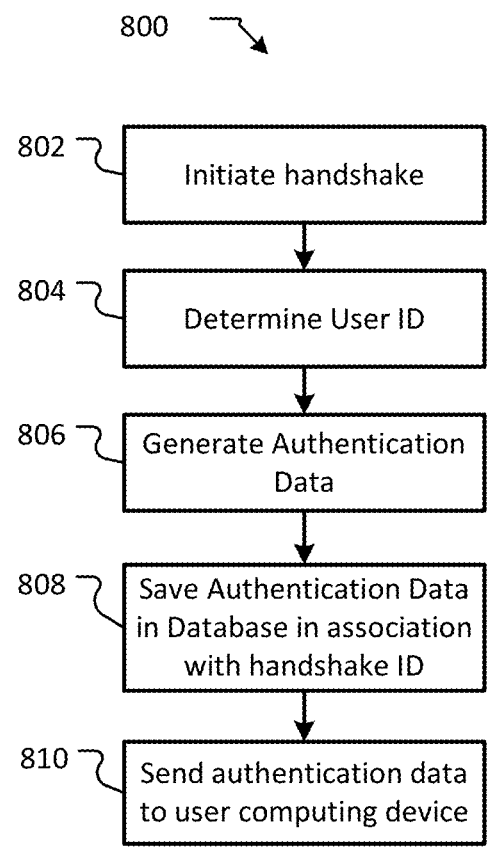
FIG. 8 is a flow chart showing an example process that may be executed by one or more computing devices to provide device and/or user authentication, in accordance with various aspects of the present disclosure.

FIG. 8 is a flow chart showing an example process 800 that may be executed by one or more computing devices (e.g., one or more computing devices providing remote system 30) to provide device and/or user authentication, in accordance with various aspects of the present disclosure. The actions of the process flow 800 may represent a series of instructions comprising computer readable machine code executable by a processing unit of a computing device. In various examples, the computer readable machine codes may be comprised of instructions selected from a native instruction set of the computing device and/or an operating system of the computing device.

The process flow 800 of FIG. 8 may begin at action 802, "Initiate handshake". At action 802, one or more computing devices (e.g., one or more computing devices implementing remote system 30) may establish a network connection with a computing device (e.g., computing device 10 of FIG. 1). In at least some examples, the network connection may be established in response to a user of the computing device 10 opening an application associated with the web system. In various examples, a user of the computing device may log in to the application using account credentials and/or may establish an authenticated session with the web system. In at least some other examples, the remote system 30 may send a push notification requesting that a handshake with the computing device 10 be established and/or refreshed.

The process flow 800 of FIG. 8 may proceed from action 802 to action 804, "Determine User ID". At action 804, the one or more computing devices of the web system may determine a user ID associated with an authenticated communication session between remote system 30 and computing device 10. In various examples, upon establishing an authenticated communication session between computing device 10 and one or more computing devices of remote system 30, computing device 10 may send an authentication token to computing device 30. In various examples, the authentication token may be effective to authenticate an application of computing device 10 (e.g., application 402 and/or a user account of application 402) to remote system 30.

The process flow 800 of FIG. 8 may proceed from action 804 to action 806, "Generate Authentication Data". At action 806, the one or more computing devices implementing remote system 30 may generate authentication data. As used herein, authentication data may refer to user ID data, an encryption key, a handshake timestamp, a user token (associated with the user ID data by remote system 30), handshake identifier data, and a set of IVs. In various examples, the user ID may identify the user account logged into application 402 during handshake request 408. In some examples, the user ID may be too large (in terms of an amount of memory required to store the user ID) to be encoded into a desired form of authentication code. For example, a user ID may be approximately 28 bytes. The desired form of the authentication code may be a one-dimensional barcode. It may not be possible to represent 28 bytes using a standard one-dimensional barcode that is of an acceptable length. Accordingly, remote system 30 may generate a user token and associate the user token with the user ID (e.g., in database 406). As depicted in FIG. 6A, the user token may be randomly generated and associated with the user ID. In the example depicted in FIG. 6A, an example user token is represented in Base64 characters. In some other implementations, the authentication data may comprise the user token, a time step value, the encryption key, and the handshake identifier.

The process flow 800 of FIG. 8 may proceed from action 806 to action 808, "Save Authentication Data in database in association with handshake identifier". At action 806, remote system 30 may save the authentication data, including the time step value and/or set of IVs, user token, encryption key in a database (e.g., database 406) in association with the handshake identifier.

The process flow 800 of FIG. 8 may proceed from action 808 to action 810, "Send authentication data to user computing device". At action 810, one or more computing devices implementing remote system 30 may send the authentication data to a user computing device (e.g., computing device 10). The authentication data may be encrypted and may be stored in a hardware keystore of the computing device. Thereafter, the user computing device may generate authentication codes using the authentication data as described above in reference to FIG. 5. The authentication codes may be used to validate the user computing device to a third party entity (e.g., to an entity associated with network-enabled device 20) even when the user computing device does not have an internet connection or when the user computing device has an unreliable internet connection.

Figure 9:
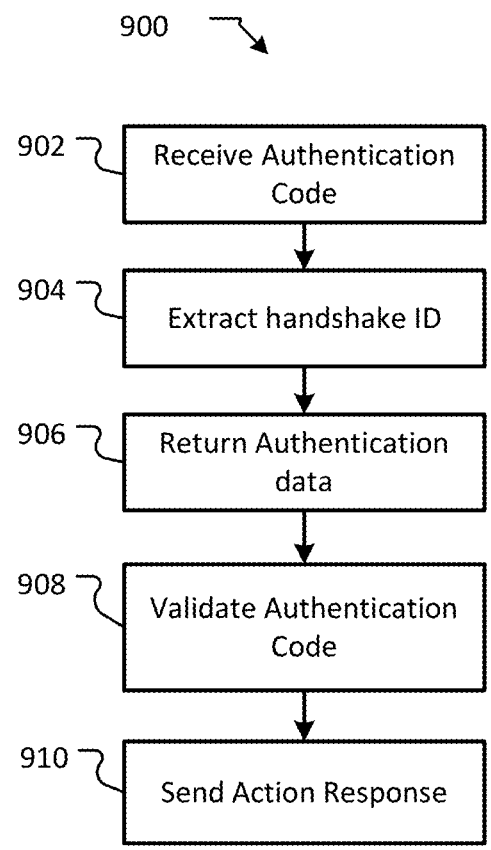
FIG. 9 is a flow chart showing an example process that may be executed by one or more computing devices to validate an authentication code, in accordance with various embodiments of the present disclosure.

FIG. 9 is a flow chart showing an example process flow 900 that may be executed by one or more computing devices (e.g., one or more computing devices implementing remote system 30) to validate an authentication code, in accordance with various embodiments of the present disclosure. The actions of the process flow 900 may represent a series of instructions comprising computer readable machine code executable by a processing unit of a computing device. In various examples, the computer readable machine codes may be comprised of instructions selected from a native instruction set of the computing device and/or an operating system of the computing device.

The process flow 900 of FIG. 9 may begin at action 902, "Receive Authentication Code". At action 902, one or more computing devices (e.g., one or more computing devices implementing remote system 30) may receive authentication code. In various examples, the authentication code may be received over network 64 from network-enabled device 20. In various examples, network-enabled device 20 may have a persistent and/or semi-persistent internet connection and may send the authentication code to remote system 30 via network 64. In various examples, network-enabled device 20 may establish a secure communication channel with remote system 30 prior to sending the authentication code.

The process flow 900 of FIG. 9 may proceed from action 902 to action 904, "Extract handshake identifier". At action 904, the one or more computing devices implementing remote system 30 may extract the handshake identifier from the authentication code. At action 906, the handshake identifier may be used to return authentication data stored in a database (e.g., database 406) in association with the handshake identifier.

The process flow 900 of FIG. 9 may proceed from action 906 to action 908, "Validate Authentication Code". At action 908, one or more computing devices implementing remote system 30 may validate the authentication code received from network-enabled device 20. In some examples, the remote system 30 may use the authentication data retrieved using the handshake identifier to validate the authentication code. The retrieved authentication data may comprise the user ID, encryption key, user token, and the set of IVs. In some other implementations, the retrieved authentication data may comprise the user token, the encryption key, the handshake identifier and a time step value. In examples using an IV set, remote system 30 may use the IV index received from network-enabled device 20 as a part of the authentication code to select the corresponding IV from the set of IVs retrieved from database 406. Remote system 30 may use the encryption key from the database 406 and the IV corresponding to the IV index to decrypt the payload of the authentication code and extract the authentication code timestamp and the user token. Remote system 30 may verify that the extracted user token matches the user token retrieved from database 406. Additionally, remote system 30 may validate that the authentication code timestamp was generated within the required timeframe, as described above in reference to FIG. 5. In at least some examples, remote system 30 may allow an additional buffer amount of time when validating the authentication code timestamp to account for latency. For example, if authentication code timestamps are specified to be valid for 2 minutes from generation before expiring, remote system 30 may determine whether or not a received authentication code timestamp was received within the past 3 minutes in order to account for latency on a communication link between network enabled device 20 and remote system 30 and/or for latency in computation time at one or more computing devices providing remote system 30.

In examples where the authentication data stored in database 406 comprises a time step value, remote system 30 may use the encryption key, time step value and user token retrieved from database 406 to independently generate a hash token using the current time. The current time may be divided by the time step value to determine a time counter value. The encryption key may be used to hash the user token and the time counter value to generate the hash token. In such an example, general time servers may be used to synchronize times used by computing device 10 and remote system 30. Remote system 30 may compare the independently-generated hash token with the hash token received as part of the authentication code from network-enabled device 20 to determine whether or not the hash tokens match. If the hash tokens match, the user computing device may be authenticated to network-enabled device 20. Additionally, one time step value prior to the current time may be used to accommodate latency between time of generation of the authentication code on computing device 10 and the authentication code reaching remote system 30.

The process flow 900 of FIG. 9 may proceed from action 908 to action 910, "Send Action Response". At action 910, the one or more computing devices (e.g., one or more computing devices implementing remote system 30) may send an action response to the network-enabled device 20 from which the authentication code was received. In some further examples, remote system 30 may be effective to determine whether or not the authentication code being validated was used more than a threshold number of times. For example, remote system 30 may determine whether the authentication code being validated has been used more than 5 times during the validity of the authentication code as defined by the authentication code timestamp. If the authentication code has been used greater than the threshold number of times, remote system 30 may send a response to network-enabled device 20 at action 910 to decline the requested action. Conversely, if the authentication code is successfully validated within the required timeframe (e.g., 2 minutes, 3 minutes, 5 minutes, or any suitable amount of time) and the authentication code has been used less than the threshold number of times, the response generated by remote system 30 at action 910 may indicate a successful validation. The response may be sent to network-enabled device 20 over network 64. Accordingly, computing device 10 and/or a user or user account associated with computing device 10 may be successfully validated to network-enabled device 20 by remote system 30. As such, network-enabled device 20 may authorize computing device 10 and/or a user of computing device 10 to perform the requested action.

In the embodiments described herein using a time step value as a part of the authentication, the time step value may be selected so as to account for latency of communication between network-enabled device 20 and remote system 30. Additionally, the time step value may be selected to determine the amount of time for which an authentication code (including a hash token) is valid. For example, in the time step embodiments described above, when remote system 30 receives an authentication code, remote system 30 may subtract one time step from the current time to generate a modified current time value. The modified current time value may be used together with the time step value, encryption key, and user token stored in the server-side database (e.g., database 406) to generate a hash token. If the hash token received in the authentication code was generated prior to one time step value before the current time, the hash token independently generated by the server (based on the modified current time value) will not match the received hash token. Accordingly, the time step value may be related to an amount of time for which a particular authentication code is valid. As such, in an example, the time step value may prevent a would-be thief from photographing an authentication code displayed on a user device from later fraudulently using the authentication code, provided that the later, fraudulent use was greater than 1 time step value after the generation of the authentication code.

Techniques such as those described above may offer technical improvements to the computer-related field of secure authentication of computing devices and user accounts. Advantageously, the various techniques described herein may allow a user computing device and/or a user account to be validated to a third party even when the user computing device is unable to establish a reliable connection to the internet. Additionally, the various techniques described herein provide security improvements that may mitigate risks involved with theft of computerized data that may allow a would-be attacker to electronically impersonate an account holder.

Figure 10:
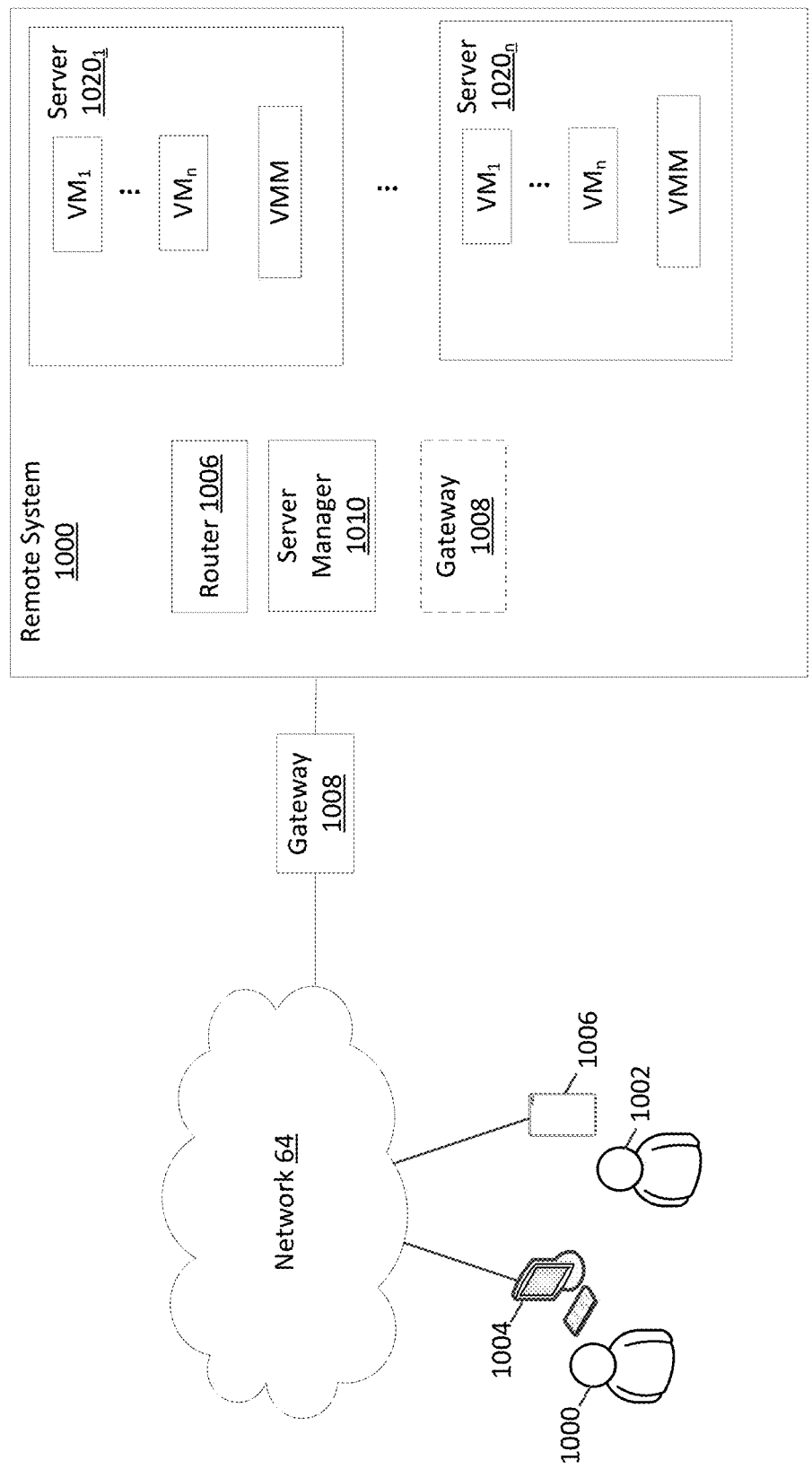
FIG. 10 illustrates an example computing environment in which the various embodiments described herein may be implemented, in accordance with various aspects of the present disclosure.

An example system for sending data will now be described in detail. In particular, FIG. 10 illustrates an example computing environment in which the embodiments described herein may be implemented. FIG. 10 depicts an example remote system 1000 that can provide computing resources to one or more users (e.g., users 1000 and 1002) via user computers 1004 and 1006 via a communications network 64 (described above in reference to FIG. 1). Remote system 1000 may be configured to provide computing resources for executing applications on a permanent or an as-needed basis. For example, remote system 1000 may execute the various processes of remote system 30 described above in reference to FIGS. 1-9. The computing resources provided by remote system 1000 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web systems. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Users may choose to allocate a number of small processing resources as web servers and/or one large processing resource as a database server, for example.

Remote system 1000 may include any number of servers 1020 (including servers $1020_1 \ldots 1020_n$) that may provide computing resources. These resources may be available as bare metal resources or as virtual machine instances $VM_1$-$VM_n$. Virtual machine instances may be rendition switching virtual machine instances. The virtual machine instances may be configured to perform all, or any portion, of the techniques for utilizing user input cues for improved video encoding and/or any other of the disclosed techniques in accordance with the present disclosure and described in detail above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 64 may, for example, be a publicly accessible network of linked networks and possibly operated by various distinct parties, such as the Internet. In other embodiments, communications network 64 may be a private network, such as a corporate or university network that is wholly or partially inaccessible to non-privileged users. In still other embodiments, communications network 64 may include one or more private networks with access to and/or from the Internet.

Communication network 64 may provide access to user computers 1004, 1006. Computing device 10, described above in reference to FIG. 1, may be an example of a user computer 1004 or 1006. User computers 1004, 1006 may be computers utilized by users 1000, 1002. For instance, user computer 1004 or 1006 may be a server, a desktop or laptop personal computer, a tablet computer, a wireless telephone, a personal digital assistant (PDA), an e-book reader, a game console, a set-top box or any other computing device capable of accessing remote system 1000. User computer 1004 or 1006 may connect directly to the Internet (e.g., via a cable modem or a Digital Subscriber Line (DSL)). Although only two user computers 1004 and 1006 are depicted, it should be appreciated that there may be multiple user computers.

One or more computers (e.g., computers 1004, 1006) may also be utilized to configure aspects of the computing resources provided by remote system 1000. In this regard, remote system 1000 might provide a gateway or web interface through which aspects of its operation may be configured through the use of a web browser application program executing on user computers 1004, 1006. Alternately, a stand-alone application program executing on user computers 1004, 1006 might access an application programming interface (API) exposed by remote system 1000 for performing the configuration operations. Other mechanisms for configuring the operation of various web services available at remote system 1000 might also be utilized.

Servers shown in FIG. 10 may be servers configured appropriately for providing the computing resources described above and may provide computing resources for executing one or more web services and/or applications. In one embodiment, the computing resources may be virtual machine instances $VM_1$-$VM_n$. In the example of virtual machine instances, each of the servers may be configured to execute a virtual machine manager (VMM) capable of executing the virtual machine instances. The VMMs may be configured to enable the execution of virtual machine instances one or more of the servers of remote system 1000, for example. As discussed above, each of the virtual machine instances may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example remote system 1000 shown in FIG. 10, a router 1006 may be utilized to interconnect the servers. Router 1006 may also be connected to gateway 1008, which is connected to communications network 64. In various examples gateway 1008 may be a part of remote system 1000 or may be configured in communication with remote system 1000. Router 1006 may be connected to one or more load balancers, and alone or in combination may manage communications within networks in remote system 1000, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example remote system 1000 shown in FIG. 10, a server manager 1010 is also employed to at least in part direct various communications to, from and/or between the various servers of remote system 1000. Server manager 1010 may, in some cases, examine portions of incoming communications from user computers 1004, 1006 to determine one or more appropriate servers to receive and/or process the incoming communications. Server manager 1010 may determine appropriate servers to receive and/or process the incoming communications based on factors such as an identity, location or other attributes associated with user computers 1004, 1006, a nature of a task with which the communications are associated, a priority of a task with which the communications are associated, a duration of a task with which the communications are associated, a size and/or estimated resource usage of a task with which the communications are associated and many other factors. Server manager 1010 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that remote system 1000 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Although various systems described herein may be embodied in software or code executed by general-purpose hardware as discussed above, as an alternative, the same may also be embodied in dedicated hardware or a combination of software/general-purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and, consequently, are not described in detail herein. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processing component in a computer system. If embodied in hardware, each block may represent a circuit or a number of interconnected circuits to implement the specified logical function(s).

Although the processes, flowcharts, and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is to be understood that all such variations are within the scope of the present disclosure.

Also, any logic or application described herein that comprises software or code can be embodied in any non-transitory computer-readable medium for use by or in connection with an instruction execution system, such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method of authenticating a user account, the method comprising:
   establishing a communication session between a remote system and an application executing on a user computing device;
   generating, by the remote system, authentication data, wherein the authentication data comprises an encryption key, a set of initialization vectors (IVs), a handshake identifier, and user token data, wherein:
   a first IV of the set of IVs is effective to be used with the encryption key to encrypt data; and
   the user token data is associated with the user account;
   storing, by the remote system, the authentication data in a database;
   sending, by the remote system, the authentication data to the application executing on the user computing device, wherein the handshake identifier is associated with the encryption key, the set of IVs, and the user token data;
   receiving, by the remote system from a second computing device, authentication code data received by the second computing device from the application executing on the user computing device, wherein the authentication code data encodes the handshake identifier, an IV index value, and encrypted payload data;
   requesting, by the remote system, the authentication data from the database using the handshake identifier;
   receiving, by the remote system, the authentication data;
   determining the first IV using the IV index value;
   decrypting the encrypted payload data using the encryption key and the first IV to generate decrypted payload data, wherein the decrypted payload data comprises the user token data and authentication code timestamp data;
   determining that the user token data from the decrypted payload data matches the user token data retrieved from the database;
   determining that the authentication code timestamp data indicates that the authentication code data was generated by the application executing on the user computing device within a first threshold amount of time of a receipt time at which the authentication code data was received by the remote system; and
   sending a response to the second computing device, wherein the response validates the user account to the second computing device.

2. The computer-implemented method of claim 1, further comprising:
   generating, by the remote system, time to live (TTL) data, wherein the TTL data denotes an amount of time for which the authentication data is valid;
   storing, by the remote system, the TTL data in the database in association with the handshake identifier;
   determining, by the remote system, that the authentication data has been stored in the database for greater than a second threshold amount of time;
   generating, by the remote system, second authentication data comprising a second encryption key, a second set of IVs, a second handshake identifier, and second user token data;
   storing, by the remote system, the second authentication data in the database; and
   sending the second authentication data to the user computing device, wherein the second handshake identifier corresponds to the second encryption key, the second set of IVs, and the second user token data.

3. The computer-implemented method of claim 1, further comprising:

determining, by the remote system, that greater than a threshold percentage of IVs of the set of IVs has been previously used to encrypt data;

generating, by the remote system, second authentication data comprising a second encryption key, a second set of IVs, a second handshake identifier, and second user token data;

storing, by the remote system, the second authentication data in the database; and sending the second authentication data to the user computing device, wherein the second handshake identifier corresponds to the second encryption key, the second set of IVs, and the second user token data.

4. A system comprising:
at least one processor; and
a non-transitory, computer-readable memory storing instructions that, when executed by the at least one processor, program the at least one processor to:
receive authentication data from a first computing device over a first network connection, the authentication data comprising a first handshake identifier, a first user token, and an encryption key, wherein the first handshake identifier corresponds to the first user token and the encryption key;
store the first handshake identifier, the first user token, and the encryption key in a keystore repository of the non-transitory, computer-readable memory;
initiate an authentication process with a second computing device;
receive, at a second time, the stored first handshake identifier, the first user token, and the encryption key from the keystore repository;
generate encrypted payload data based at least in part on the first user token and the encryption key;
generate first authentication code data comprising the encrypted payload data and the first handshake identifier; and
send the first authentication code data to the second computing device.

5. The system of claim 4, wherein the instructions, when executed by the at least one processor, are further effective to program the at least one processor to:
generate timestamp data indicating a time at which the first authentication code data is generated, wherein the encrypted payload data is generated further based on the timestamp data.

6. The system of claim 4, wherein the instructions, when executed by the at least one processor, are further effective to program the at least one processor to:
generate the encrypted payload data using the encryption key to generate a hash of the first user token and time counter data, wherein the time counter data corresponds to a time difference value divided by a time step value, wherein the time difference value represents a difference between a first time at which the authentication data was received and a current time.

7. The system of claim 4, wherein the instructions, when executed by the at least one processor, are further effective to program the at least one processor to:
send the first authentication code data to the second computing device by displaying a one-dimensional barcode on a display of the first computing device.

8. The system of claim 4, wherein the authentication data further comprises a set of initialization vectors (IVs), and wherein the instructions, when executed by the at least one processor, are further effective to program the at least one processor to:

store the set of IVs in the keystore repository in association with the first handshake identifier, and wherein to generate the encrypted payload data, the at least one processor is further effective to:
encrypt the first user token with the encryption key and a first initialization vector of the set of IVs, wherein the first authentication code data further comprises an initialization vector index value effective to identify the first initialization vector from among the set of IVs.

9. The system of claim 4, wherein the instructions, when executed by the at least one processor, are further effective to program the at least one processor to:
receive time step data, wherein the time step data comprises an indication of a first amount of time;
determine, by the first computing device, a time difference value, wherein the time difference value represents a difference between a first time at which the authentication data was received and a current time;
generate time counter data by dividing the time difference value by the first amount of time; and
generate the encrypted payload data using the encryption key to generate a hash of the first user token and the time counter data.

10. The system of claim 4, wherein the instructions, when executed by the at least one processor, are further effective to program the at least one processor to:
identify time to live (TTL) data, wherein the TTL data indicates an amount of time for which the first handshake identifier is valid;
store the TTL data in the keystore repository in association with the first handshake identifier;
determine that the first handshake identifier has been stored in the keystore repository for greater than the amount of time; and
request second authentication data from the first computing device, wherein the second authentication data comprises a second handshake identifier, a second user token, and a second encryption key.

11. The system of claim 4, wherein the authentication data further comprises a set of initialization vectors (IVs), wherein the instructions, when executed by the at least one processor, are further effective to program the at least one processor to:
store the set of IVs in the keystore repository in association with the first handshake identifier, wherein to generate the encrypted payload data the at least one processor is effective to encrypt the first user token with the encryption key and a first initialization vector of the set of IVs, wherein the first authentication code data further comprises a first initialization vector index value effective to identify the first initialization vector from among the set of IVs;
generate second encrypted payload data based at least in part on the first user token and then encryption key, wherein to generate the second encrypted payload data the at least one processor is effective to encrypt the first user token with the encryption key and a second initialization vector of the set of IVs to generate a second encrypted token; and
generate second authentication code data comprising the second encrypted token, the first handshake identifier, and a second initialization vector index value effective to identify the second initialization vector from among the set of IVs, wherein the second authentication code data is generated at least two minutes after the first authentication code data is generated.

12. The system of claim 4, wherein to send the first authentication code data to the second computing device the at least one processor is effective to send a near field communication signal representing the first authentication code data to the second computing device.

13. The system of claim 4, wherein the authentication data further comprises a set of initialization vectors (IVs) and wherein the instructions, when executed by the at least one processor, are further effective to program the at least one processor to:
store the set of IVs in the keystore repository in association with the first handshake identifier;
determine that greater than a threshold percentage of IVs of the set of IVs have been previously used to encrypt data; and
request second authentication data from the first computing device, wherein the second authentication data comprises a second handshake identifier, a second user token, a second set of IVs, and a second encryption key.

14. A method, comprising:
receiving authentication data from a first computing device over a first network connection, the authentication data comprising a first handshake identifier, a first user token, and an encryption key, wherein the first handshake identifier corresponds to the first user token and the encryption key;
storing the first handshake identifier, the first user token, and the encryption key in a keystore repository;
initiating an authentication process with a second computing device;
receiving, at a second time, the stored first handshake identifier, the first user token, and the encryption key from the keystore repository;
generating encrypted payload data based at least in part on the first user token and the encryption key;
generating first authentication code data comprising the encrypted payload data and the first handshake identifier; and
sending the first authentication code to the second computing device.

15. The method of claim 14, further comprising:
generating timestamp data indicating a time at which the first authentication code data is generated, wherein the encrypted payload data is generated further based on the timestamp data.

16. The method of claim 14, further comprising:
generating the encrypted payload data using the encryption key to generate a hash of the first user token and time counter data, wherein the time counter data corresponds to a time difference value divided by a time step value, wherein the time difference value represents a difference between a first time at which the authentication data was received and a current time.

17. The method of claim 14, further comprising:
sending the first authentication code data to the second computing device by displaying a one-dimensional barcode on a display of the first computing device.

18. The method of claim 14, further comprising:
storing the authentication data comprising a set of initialization vectors (IVs) in the keystore repository in association with the first handshake identifier; and
encrypting the first user token with the encryption key and a first initialization vector of the set of IVs, wherein the first authentication code data further comprises an initialization vector index value effective to identify the first initialization vector from among the set of IVs.

19. The method of claim 14, further comprising:
receiving time step data, wherein the time step data comprises an indication of a first amount of time;
determining, by the first computing device, a time difference value, wherein the time difference value represents a difference between a first time at which the authentication data was received and a current time;
generating time counter data by dividing the time difference value by the first amount of time; and
generating the encrypted payload data using the encryption key to generate a hash of the first user token and the time counter data.

20. The method of claim 14, further comprising:
identifying time to live (TTL) data, wherein the TTL data indicates an amount of time for which the first handshake identifier is valid;
storing the TTL data in the keystore repository in association with the first handshake identifier;
determining that the first handshake identifier has been stored in the keystore repository for greater than the amount of time; and
requesting second authentication data from the first computing device, wherein the second authentication data comprises a second handshake identifier, a second user token, and a second encryption key.

* * * * *